(No Model.)
S. C. C. CURRIE.
SECONDARY BATTERY.
No. 422,505. Patented Mar. 4, 1890.
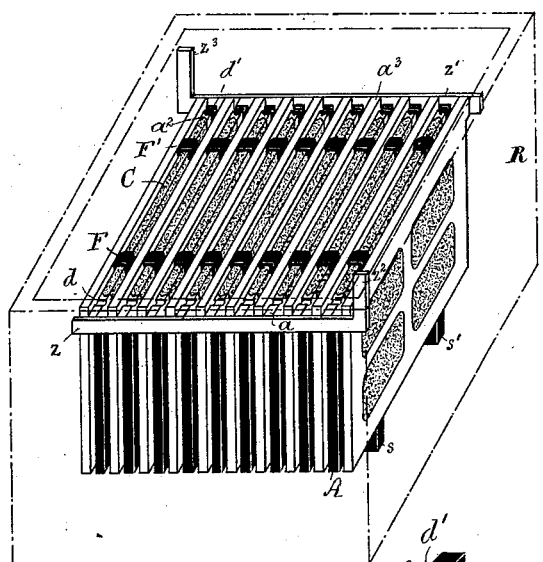
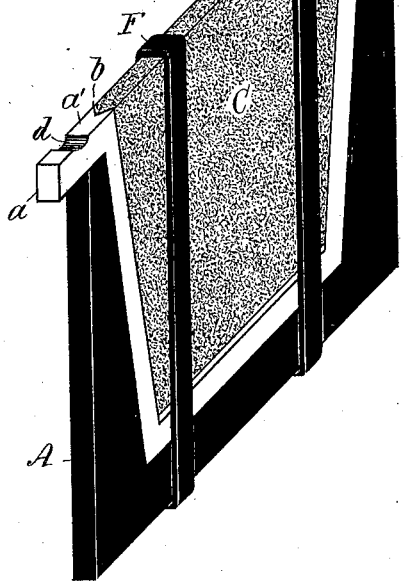
Witnesses:
Hermann Bormann.
Thomas M. Smith.
Inventor:
Stanley C. C. Currie,
by J. Walter Douglass.
Atty.

UNITED STATES PATENT OFFICE.

STANLEY CHARLES CUTHBERT CURRIE, OF PHILADELPHIA, PENNSYLVANIA, ASSIGNOR TO THE UNITED GAS IMPROVEMENT COMPANY, OF SAME PLACE.

SECONDARY BATTERY.

SPECIFICATION forming part of Letters Patent No. 422,505, dated March 4, 1890.

Application filed October 21, 1889. Serial No. 327,612. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in Secondary or Storage Batteries, of which the following is a specification.

The principal object of my invention is to provide a supporting-frame provided with a receptacle in which the walls thereof are lined with a good conducting material and adapted to receive and hold a battery plate or element composed of active material or material to become active, and the frame arranged to permit of the battery plate or element being removed and another inserted without disturbing the other plates or elements of the system mounted in battery, and of such type as forms the subject-matter of an application for a patent filed by me under date of June 6, 1889, and serially numbered 313,257.

A further object of my invention is to provide supporting-frames for the reception of two systems of battery plates or elements mounted in a cell containing a fluid and constituting a secondary or storage battery with projecting bars of conducting material, to which metal strips are suitably applied having terminals or conductors, and arranged so that the connection between the respective systems of plates or elements mounted in battery are below the surface of the fluid, whereby in the local action taking place the contact of the air with the fluid is at the terminal point of each system of plates or elements, and, furthermore, such arrangement of the battery affords much better facility for the proper insulation of the plates or elements at said points.

My invention consists of a supporting-frame for a battery plate or element, of any suitable exterior shape or form, and provided with a receptacle having, preferably, tapering walls which are lined with a conducting material to insure a good contact between the frame and the battery plate or element, and the said receptacle capable of receiving and firmly holding the plate or element, and also permitting of the ready removal of the same for the insertion of another without disturbing the other plates or elements similarly mounted in battery.

The nature and characteristic features of my invention will be more fully understood by reference to the accompanying drawings, forming part hereof, in which—

Figure 1 is a perspective view of two systems of plates or elements mounted in supporting-frames embodying the features of my invention and each properly insulated from the other in the cell, and Fig. 2 is a similar view of one of the plates or elements mounted in a supporting-frame embodying the particular features of my invention and wedged therein by means of bands of insulating material.

Referring to the drawings, A is the supporting-frame, of ebonite, porcelain, wood, or other preferred material. This frame, of any exterior shape or form, is provided with a receptacle, into which a plate or element C is inserted and held in position. One of the vertical walls $a'$ of the receptacle projects beyond the opposing one $a^2$, forming a lug or terminal $a$. The walls $a'$ and $a^2$ of the receptacle taper, by preference, from top to bottom—that is, the space between the two walls, is greater at the top than at the bottom—and these walls are preferably provided with grooves or recesses $b$ and $b$ for the reception of a plate or element C, composed of active material or material to become active.

The walls of the receptacle for receiving and holding the plate or element C are lined with lead or other preferred conducting material, in order that when a plate or element C is wedged in the frame in a manner to be hereinafter more fully described a good contact will be insured between the frame and plate or element C for the passage of the electric current from a suitable source through the lug or terminal $a$ and the walls of conducting material $a'$ and $a^2$ to the plate or element C.

The plate or element C is inserted in the frame A and held in position in the grooved or recessed side walls $a'$ and $a^2$ thereof, and one or more bands F and F', of insulating material, as rubber, are then caused to circumscribe or surround the frame A and plate or element C, whereby sufficient pressure is exerted against said plate or element C to insure a good contact between said frame and plate or element. A space is preferably left between the lower edge of the inserted active plate or element C and the upper edge of the wall of conducting material with which the bottom of the frame A is lined, to allow sufficient play of the plate or element and to compensate for expansion or other action of the plate or element either while forming or discharging mounted in battery.

The bands F and F', of insulating material, which encircle or surround the bottom of the frame and the upper edge and portions of the faces or sides of the plate or element C, not only serve to properly insulate one plate or element from its neighbor in the cell R, but also permit of the active plate or element being readily removed for the insertion of another by simply placing the respective bands F and F' in the recesses $d$ and $d'$ of the supporting-frame A.

In Fig. 1 is shown a cell R, containing a suitable fluid, wherein is inserted two systems of plates or elements constituting the anodes and cathodes of the battery in supporting-frames A, mounted upon insulating-bars $s$ and $s'$, and the respective systems of plates or elements C, mounted in the frames A, are insulated from each other by means of the rubber bands F and F'. Each supporting-frame A, provided with an interior wall of conducting material surrounding the receptacle adapted to hold in position the plate or element, projects laterally at one end of the frame, forming a terminal $a$, and to which is suitably secured or applied a longitudinal strip $z$ or $z'$ with a terminal or conductor $z^2$ or $z^3$. The respective lugs $a$ and $a^3$ and the longitudinal strips $z$ and $z'$, when the plates or elements are mounted in battery, are below the surface of the fluid of the cell R, and with the terminals or conductors $z^2$ and $z^3$ only projecting above the cell R, whereby the contact of the air with the fluid in the local action taking place is at said points and better insulation of the plates or elements afforded at the several points, but especially around about the terminal points $z^2$ and $z^3$ of the respective systems of anodes and cathodes.

In the arrangement of the supporting-frames in the manner described, in which they become permanent fixtures of the cell, any of the plates or elements of the two systems may be readily removed without disturbing the others mounted in battery.

Having thus described the nature and objects of my invention, what I claim as new, and desire to secure by Letters Patent, is—

1. A supporting-frame for a battery plate or element, provided with a receptacle having vertically-inclined walls lined with a conducting material, and said receptacle adapted to receive and firmly hold the plate or element, substantially as and for the purposes set forth.

2. A supporting-frame for a battery plate or element, having a receptacle with grooved walls of conducting material, and said receptacle adapted to receive and firmly hold a plate or element, and insulating-bands encircling said frame and plate or element, substantially as and for the purposes set forth.

3. In an electric battery, two systems of supporting-frames having the inner walls lined with a good conducting material, and the receptacles of said frames adapted to receive the battery plates or elements composed of active material or material to become active, and the walls of conducting material extending laterally forming lugs, and longitudinal metal strips provided with terminals or conductors applied to said lugs, substantially as and for the purposes set forth.

4. In an electric battery, two systems of supporting-frames with grooved walls of conducting material adapted to receive and hold the battery plates or elements, and the conducting material extended laterally beyond one end of each frame, forming a lug, longitudinal strips with vertical terminals applied to said lugs, and the plates or elements mounted in said frames immersed in a fluid, with the vertical terminals of said metal strips extending above said fluid, substantially as and for the purposes set forth.

In witness whereof I have hereunto set my signature in the presence of two subscribing witnesses.

STANLEY CHARLES CUTHBERT CURRIE.

Witnesses:
GEO. W. REED,
THOMAS M. SMITH.